United States Patent

Kuramochi et al.

[11] Patent Number: 6,045,228
[45] Date of Patent: *Apr. 4, 2000

[54] OPTICAL MODULATION DEVICE AND PROJECTOR

[75] Inventors: Junko Kuramochi, Yokohama; Osamu Koyama, Hachioji, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/080,814

[22] Filed: May 19, 1998

[30] Foreign Application Priority Data

May 20, 1997 [JP] Japan .................................. 9-147124

[51] Int. Cl.⁷ .................................................. G03B 21/14
[52] U.S. Cl. ................................ 353/20; 353/31; 349/5
[58] Field of Search ........................... 353/31, 33, 34, 353/37, 20; 349/7, 8; 359/566, 567, 569, 571, 573, 575

[56] References Cited

U.S. PATENT DOCUMENTS

| | | | |
|---|---|---|---|
| 4,798,448 | 1/1989 | van Raalte | 350/345 |
| 5,108,172 | 4/1992 | Flasck | 353/31 |
| 5,161,042 | 11/1992 | Hamada | 359/41 |
| 5,231,432 | 7/1993 | Glenn | 353/34 |
| 5,237,435 | 8/1993 | Kurematsu et al. | 353/34 |
| 5,467,206 | 11/1995 | Loiseaux et al. | 353/34 |
| 5,513,025 | 4/1996 | Watanabe et al. | 359/569 |
| 5,623,348 | 4/1997 | Ogino | 353/31 |
| 5,648,860 | 7/1997 | Ooi et al. | 353/31 |
| 5,755,501 | 5/1998 | Shinohara et al. | 353/31 |
| 5,760,850 | 6/1998 | Nakanishi et al. | 349/5 |
| 5,801,795 | 9/1998 | Ogino | 349/5 |

OTHER PUBLICATIONS

Applied Optics, vol. 17, No. 15 (Aug. 1, 1978) pp. 2273–2279.

Primary Examiner—William Dowling
Attorney, Agent, or Firm—Fitzpatrick, Cella, Harper & Scinto

[57] ABSTRACT

There is disclosed an optical modulation device provided with a binary-type diffraction grating for separating incident light into plural colored lights and an optical modulation element including plural pixels and modulating the incident light in each of the pixels wherein the colored lights from the diffraction grating are introduced into the pixels provided respectively for the colored lights in the optical modulation element. The optical modulation element comprises a portion for controlling the optical modulation, a portion controlled by the optical modulation, an entrance side polarizing element, and an exit side polarizing element, wherein the polarizing direction of the entrance side polarizing element is parallel to a plane formed by the grating direction vector of the diffraction grating and the normal line vector thereof.

44 Claims, 10 Drawing Sheets

OPTICAL MODULATION DEVICE AND PROJECTOR

BACKGROUND OF THE INVENTION

1. Field of the Invention

The present invention relates to an optical modulation device and a projection apparatus, adapted for use in a color liquid crystal projector or the like which magnifyingly projects, a color image displayed on an image modulating device (optical modulation device) such as a liquid crystal display device onto a screen.

2. Related Background Art

Conventionally there have been proposed various projection apparatus for magnified projection of a color image formed by a liquid crystal display device onto a screen. However, the optical modulation device represented by the liquid crystal display device has been associated with a low efficiency of utilization of the illuminating light, because a significant portion of the area is occupied by the black matrix which shields the wirings of the optical modulation control portions provided in the peripheral area of the pixels.

Figure 10:
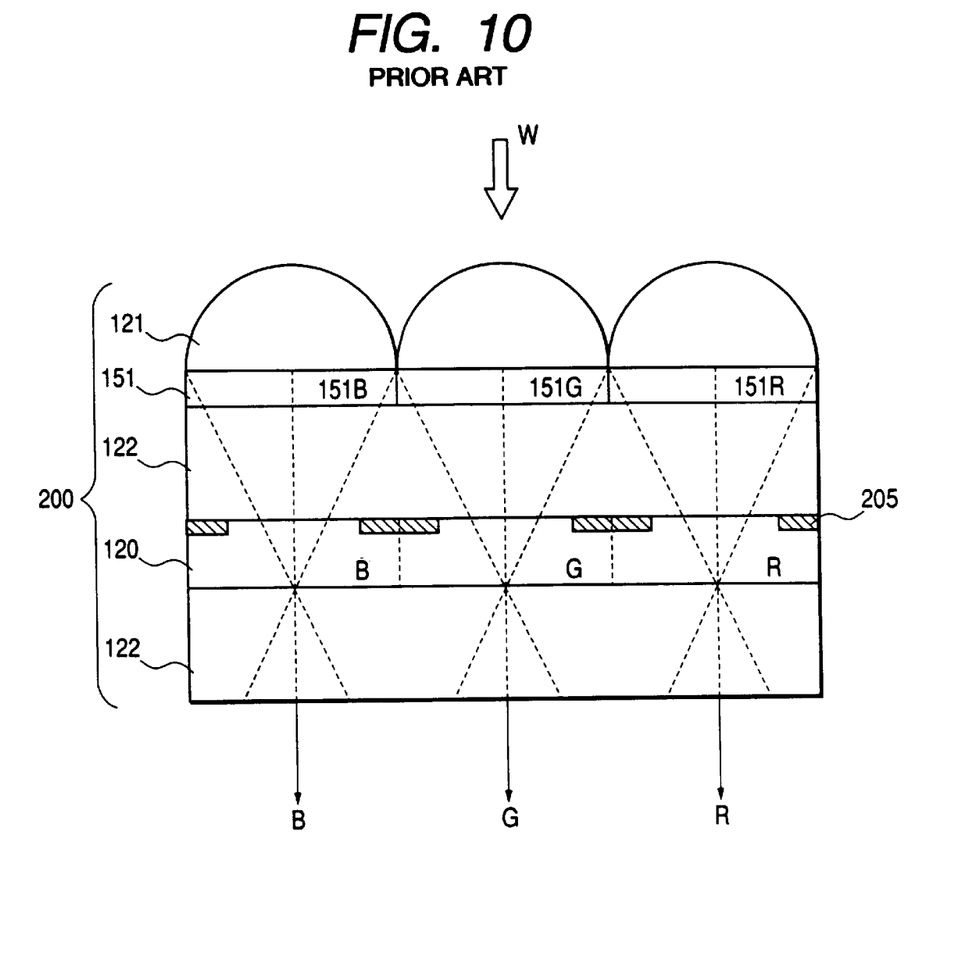
FIG. 10 is a schematic view of a conventional optical modulation apparatus.

FIG. 10 is a schematic partial view of an optical modulation device 200 which can improve the efficiency of utilization of the light. Referring to FIG. 10, a microlens array 121 is provided in front of color filters 151R, 151G, 151B for condensing the illuminating light W from a white light source onto pixels R, G, B of an optical modulation device 120, thereby improving the efficiency of light utilization of the optical modulation device 200. In FIG. 10 there are also shown a transparent substrate 122, and a black matrix 205.

However the optical modulation device shown in FIG. 10 utilizes the color filters 151R, 151G, 151B for extracting red, green and blue colored lights corresponding to the R, G and B pixels, and each color filter transmits the light of a wavelength region corresponding to the component to be extracted, but absorbs the light of other wavelength regions, thereby wasting such the light of such wavelength regions and resulting in a low efficiency of light utilization.

SUMMARY OF THE INVENTION

The optical modulation apparatus of the present invention is characterized in that the apparatus is provided with a binary-type diffraction grating for separating incident light into plural colored lights and an optical modulation element including plural pixels and modulating the incident light in each of the pixels wherein the colored lights from the diffraction grating are introduced into the pixels provided respectively for the colored lights in the optical modulation element, and the optical modulation element having:

an optical modulation control portion;
an optical modulation controlled portion;
an entrance side polarizing element; and
an exit side polarizing element;

wherein the polarizing direction of the entrance side polarizing element is parallel to a plane formed by the grating direction vector of the diffraction grating and the normal line vector thereof.

Further, the optical modulation apparatus of the present invention is characterized in that the apparatus is provided with a diffraction grating for separating incident light into plural colored lights, and optical modulation elements each including plural pixels and modulating the incident light in the pixels, and each of the optical modulation elements provided for one of the plural colored lights, wherein each of the optical modulation element includes an optical modulation control portion, an optical modulation controlled portion, an entrance side polarizing element and an exit side polarizing element, and each of the colored lights from the diffraction grating is introduced into the optical modulation controlled portion of the optical modulation element;

wherein the polarizing direction of the entrance side polarizing element is parallel to a plane formed by the grating direction vector of the diffraction grating and the normal line vector thereof.

Furthermore, the optical modulation apparatus according to each of the above-mentioned present invnetions is characterized in that the grating direction of the diffraction grating lies on a plane formed by the central axis of the light beam entering the diffraction grating and the central axis of the 0th-order diffracted light therefrom.

In each of the above-mentioned configurations, in case the entrance side polarizing element of the optical modulation element provided for each colored light is positioned between the diffraction grating and the optical modulation controlled portion, the entrance side polarizing element may be used in common for other colors.

The entrance side polarizing element can be a flat-shaped or prism-shaped polarizing beam splitter composed of a dielectric multi-layered film or a polarizing plate, capable of selecting an arbitrary linearly polarized light from the natural light.

Also there may assumed a configuration in which a plane formed by the central axis of the light beam entering the diffraction grating and the central axis of the 0-th order diffracted light from the diffraction grating is parallel to the grating direction of the diffraction grating.

Also the diffraction grating may be of one-dimensional blazed type.

Also the diffraction grating may be of reflective type having a metal film, or a metal film and a protective film, on the surface of the grating.

Also the diffraction grating may be of one-dimensional binary-type.

Also the one-dimensional binary-type diffraction grating may be of a stepped structure of which step widths are not equal.

Also the colored lights from the diffraction grating may be introduced, through a condenser lens, into the pixels of the optical modulation element.

Also there may be provided colors filters respectively corresponding to the colored lights, in a position in the optical path of the colored lights entering the plural pixels of the optical modulation element, wherein the colored lights are spatially separated.

Also the plural pixels may be composed of liquid crystal.

The liquid crystal may be TN liquid crystal.

Also the light beam entering the optical modulation element and subjected to light modulation in each pixel may be emitted by reflection with reflection means.

The projection apparatus of the present invention is characterized by projecting image information, displayed on the optical modulation element of the optical modulation apparatus of the above-mentioned various configuration, onto a predetermined plane through a projection optical system.

DETAILED DESCRIPTION OF THE PREFERRED EMBODIMENTS

Figure 1:
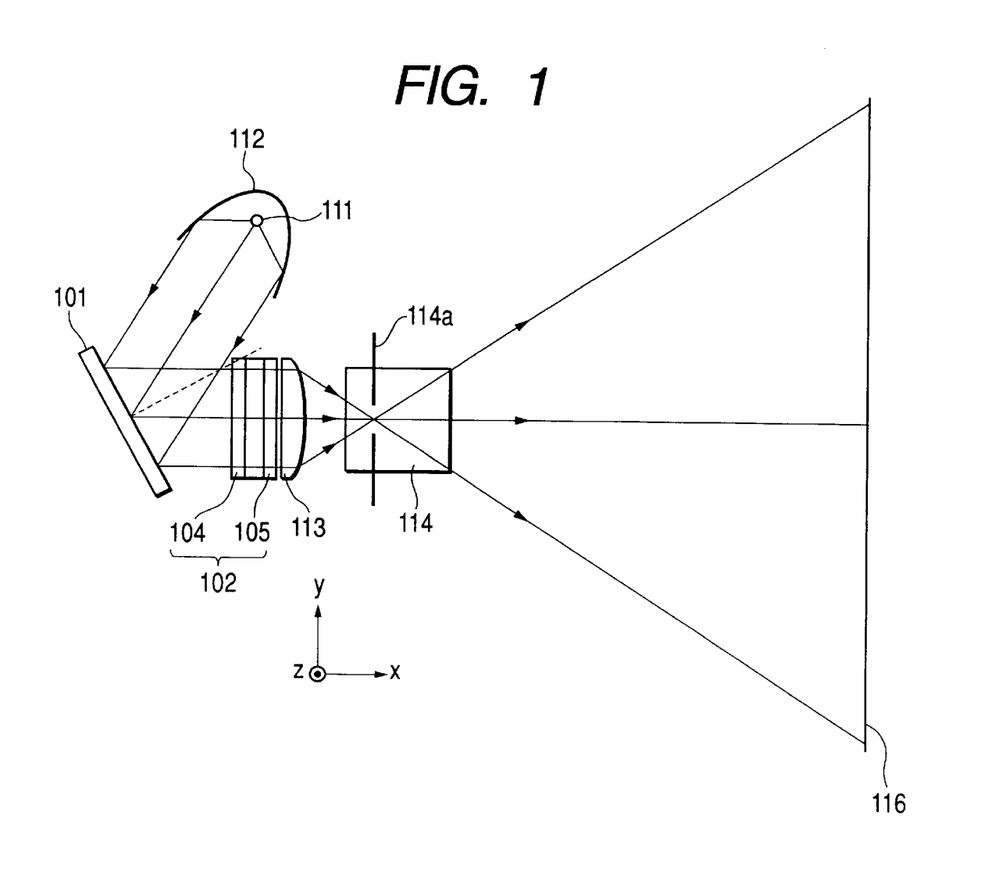
FIG. 1 is a schematic view of an embodiment 1 of the present invention.
Figure 2:
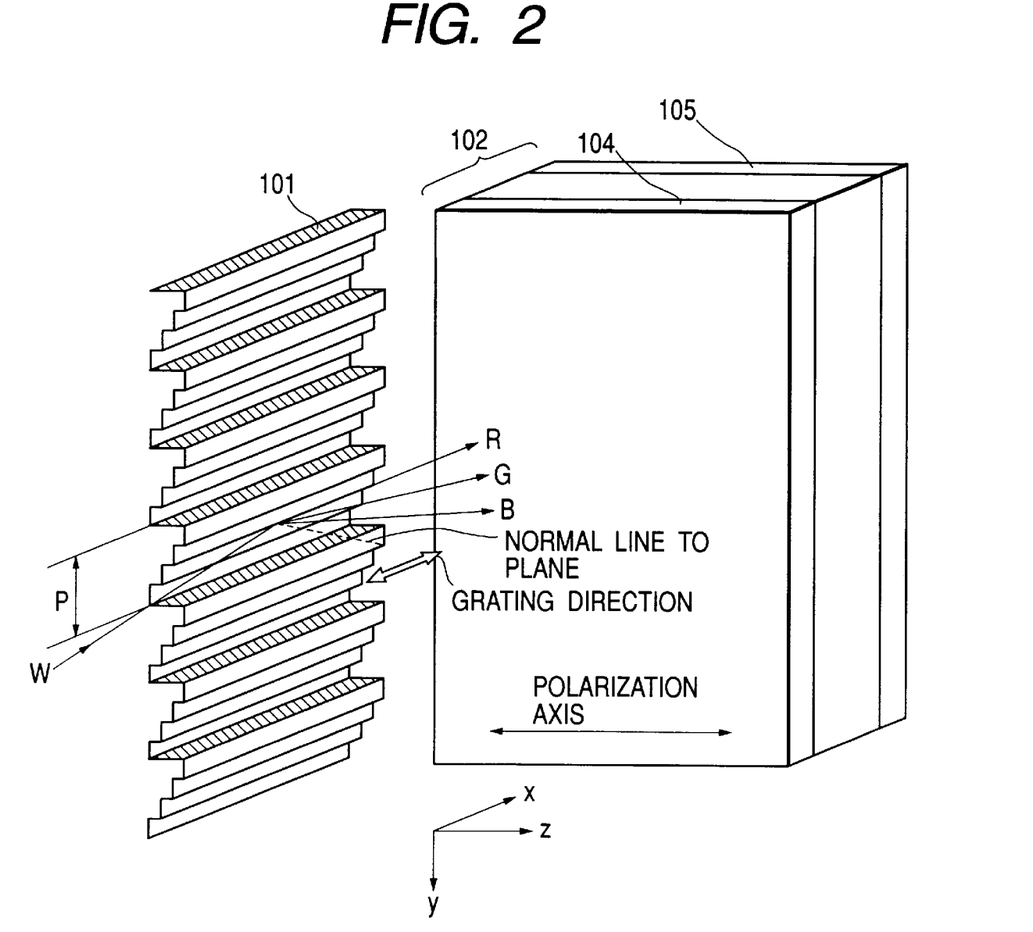
FIGS. 2 and 3 are partial magnified views of the embodiment shown in FIG. 1.
Figure 3:
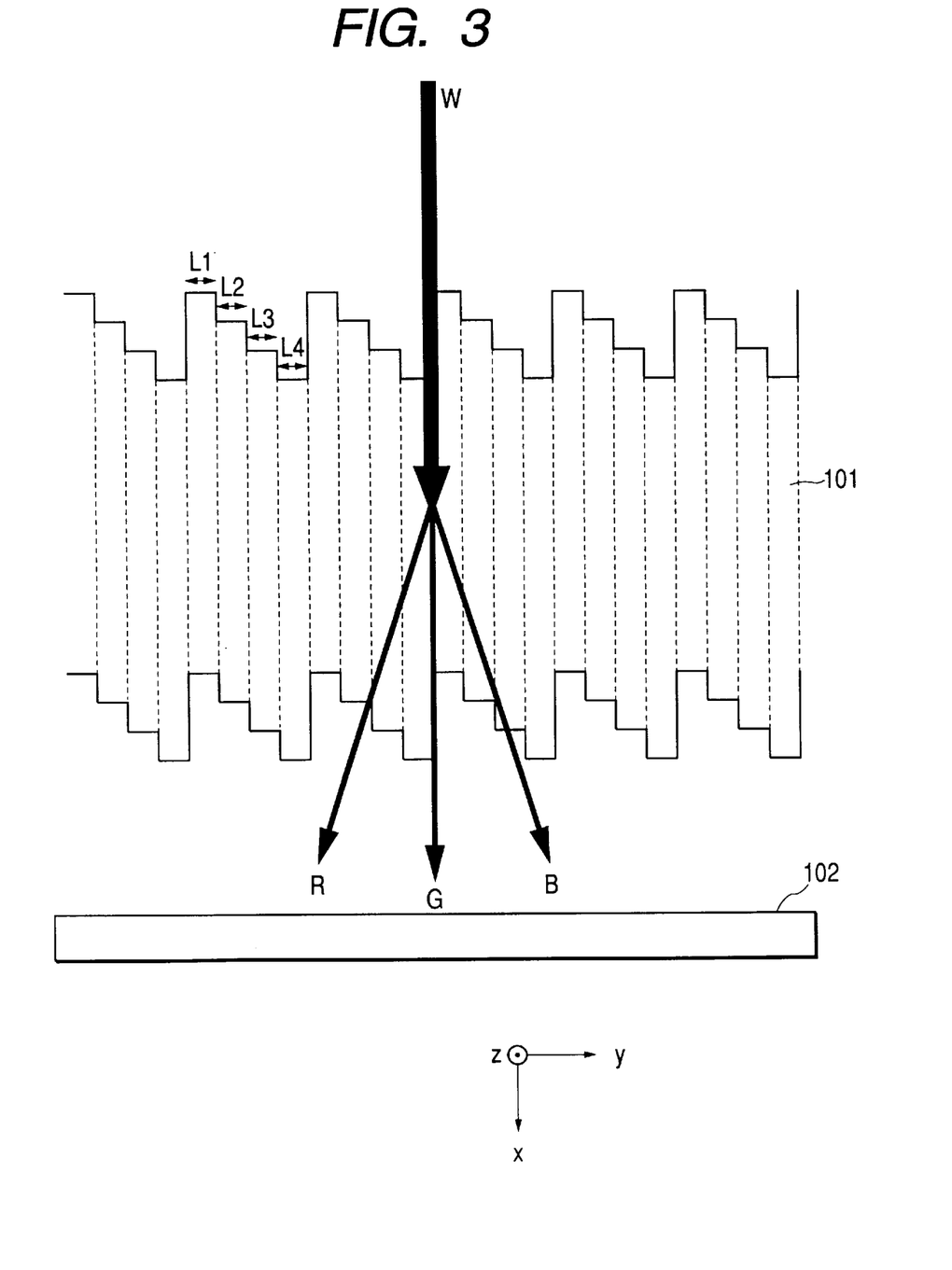

FIG. 1 is a schematic view of an embodiment 1 of the present invention, and FIGS. 2 and 3 are partial magnified views of the apparatus shown in FIG. 1. Referring to these drawings, a parabolic mirror 112 converts the light beam from a white light source 111 positioned at the focal point thereof into a parallel light beam which obliquely enters a reflective one-dimensional binary-type diffraction grating 101. The reflective one-dimensional binary-type diffraction grating 101 reflects the incident light beam with separation into three colored lights of red (R), green (G) and blue (B).

An optical modulation element 102 is composed of two polarizing plates 104, 105 which are so arranged that the polarizing axes thereof are mutually orthogonal (cross Nicol arrangement) and a liquid crystal (TN liquid crystal) or the like sandwiched therebetween, and display full-color image information. A condenser lens 113 condenses the light beam from the optical modulation element 102 onto an entrance pupil (diaphragm) 114a of a projection optical system (projection lens) 114, which serves to project the full-color image information, displayed on the optical modulation element 102, onto a screen 116.

In the following the reflective one-dimensional binary-type diffraction grating 101 shown in FIG. 1 will be explained with reference to FIGS. 2 and 3.

As shown in FIGS. 2 and 3, the reflective one-dimensional binary-type diffraction grating 101 is so constructed as to have step-shaped cross section, and is formed by coating the surface of a transparent grating, formed with resin or the like, with a reflective film such as of aluminum.

In the present embodiment, within a pitch P of the grating, there are provided four step-shaped elements of step widths L1, L2, L3 and L4, and the pitch P of the diffraction grating and the phase change amounts (step heights) thereof are so specified that a major portion of the energy of the incident light is concentrated in the 0th-order light (G light) and the ±first-order diffracted lights (R and B lights) from the diffraction grating and that the wavelengths of the highest energy (hereinafter called principal wavelengths) of the 0th-order and ±first-order diffracted lights respectively correspond to the R, G and B lights. Also in the present embodiment, the step widths L1, L2, L3, L4 are made mutually not equal.

The one-dimensional binary-type diffraction grating generating the R, G and B lights is not limited to the reflective type but a transmissive grating can also be employed in the present invention, but the features obtainable with the reflective grating will be explained in comparison with those of a transmissive one-dimensional binary-type diffraction grating.

As disclosed in Applied Optics, Vol. 17, No. 15, pp2273–2279 (8.1.1978), the transmissive diffraction grating separates the incident light beam principally into three directions by transmissive diffraction. For a blazed wavelength λ0, the grating thickness dT required for such transmissive diffraction grating is represented by:

$$dT = m \cdot \lambda 0/(n_{\lambda c}-1)$$

wherein $n_{\lambda c}$ is the refractive index of the medium constituting the diffraction grating while m is an integer. For m=2, λ0=530 nm and n=about 1.5, the transmissive diffraction grating requires a thickness dT=2120 nm.

On the other hand, the reflective one-dimensional binary-type diffraction grating requires a grating thickness dR of 749.5 nm in case the axial light beam has an incident angle of 45° to the lattice surface. As will be apparent from this comparison, the reflective diffraction grating only requires a grating thickness dT of about one-third, in comparison with the grating thickness dT of the transmissive diffraction grating.

Also in consideration of the efficiency of space utilization in the apparatus, the reflective diffraction grating is generally advantageous in realizing the compact apparatus.

In the present embodiment, as shown in FIG. 2, the diffraction grating is so positioned that the grating direction (vector) thereof lies in a plane (XZ plane) formed by the central axis (central ray) of the white light beam W obliquely entering the reflective diffraction grating 101 and the central axis (central ray) of the 0-th order diffracted light (G light) emerging from the diffraction grating. Therefore, the central axes (central rays) of the separated colored (R, G, B) lights are present in the XY plane.

Figure 4:
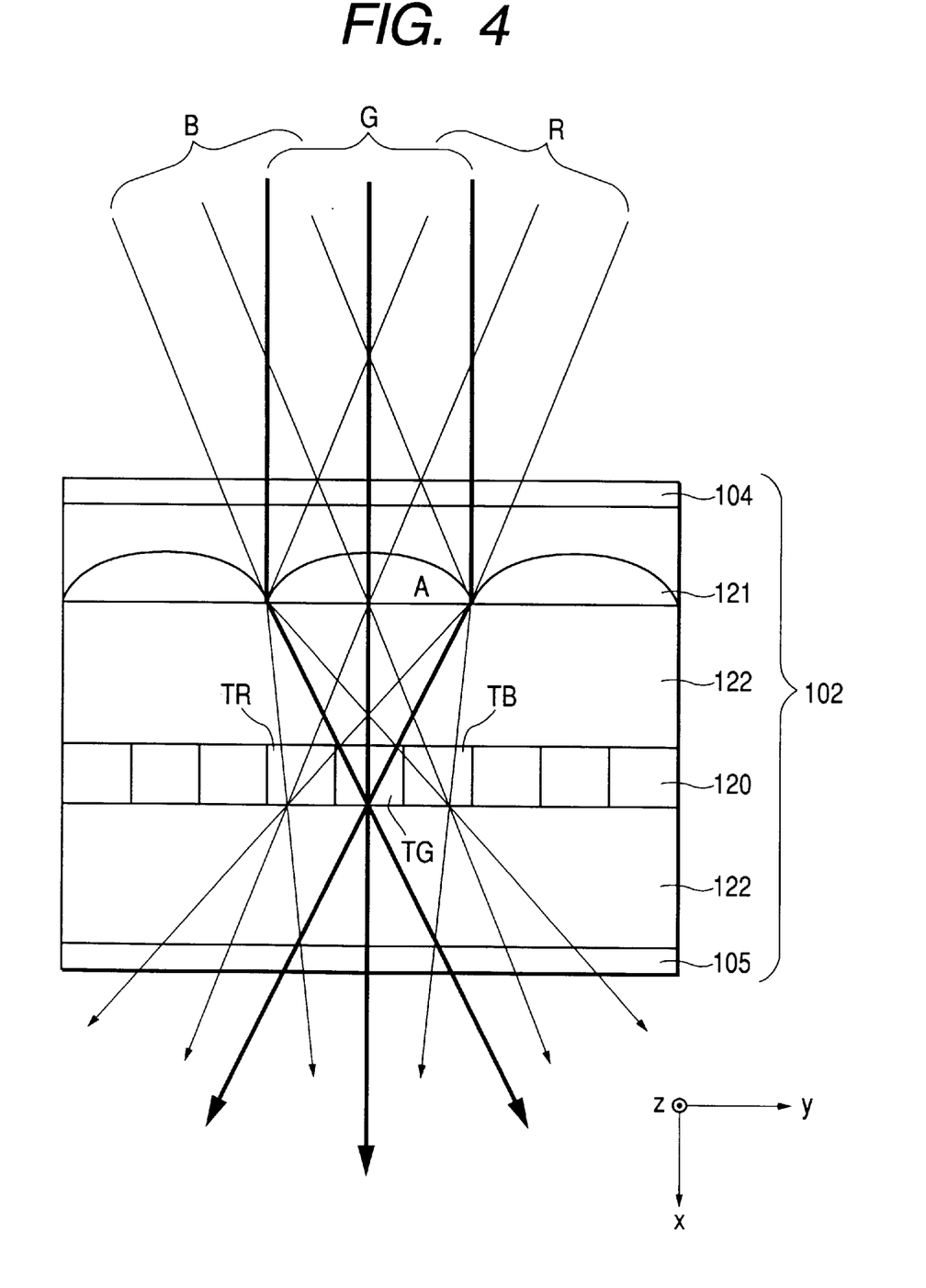
FIG. 4 is a schematic view of an optical modulation apparatus of the present invention.

FIG. 4 shows the relationship between the optical modulation element 102 and the R, G, B colored lights emerging from the reflective diffraction grating, wherein the optical modulation element 102 is provided with an optical modulation control portion (not shown) and an optical modulation controlled portion 120.

In FIG. 4, there are also shown a microlens array 121 serving as a condenser lens for condensing the incident light and composed of plural microlenses, transparent substrates 122 sandwiching the controlled portions (pixels) of the optical modulation element, an entrance side polarizing plate 104 having the polarizing axis in the direction of the Z-axis, and an exit side polarizing plate 105 having the polarizing axis in the direction of the Y-axis.

In FIG. 4, suffixes R, G and B indicate the colors (wavelength regions) of the light entering or emerging from the optical modulation element. In FIG. 4, A indicates an arbitrary microlens, TG indicates a pixel constituting the controlled portion 120 of the optical modulation element 102 containing the optical axis of the microlens A, and TR, TB indicate two pixels adjacent to the pixel TG. The R, G and B colored lights entering the microlens A, provided at the entrance side of the optical modulation element 102, with mutually different arbitrary angles are condensed by the microlens A into mutually different pixels TR, TG, TB corresponding to the respective colors, thus optically modulated by such pixels and emerge from the optical modulation element 102 as a light beam bearing image information.

Such configuration allows to separate the white light from the light source 111 by the one-dimensional binary-type diffraction grating 101 into the R, G and B colored lights without eclipse of the effective light beam at the lateral faces of the stepped structure, and effectively condensing such colored lights to the respectively corresponding pixels TR, TG, TB of the optical modulation element 102, thereby significantly improving the efficiency of light utilization.

Besides, in the present embodiment, the polarizing axis of the entrance side polarizing plate 104 is positioned parallel to the plane formed by the grating direction (vector) of the diffraction grating 101 and the normal line (vector) of the diffraction grating 101. Such arrangement is adopted in consideration of a fact that the diffraction efficiency of the light emerging from the one-dimensional binary-type diffraction grating has dependence on polarization in case the step height is not negligible in comparison with the step width within a grating pitch.

Figure 5A:
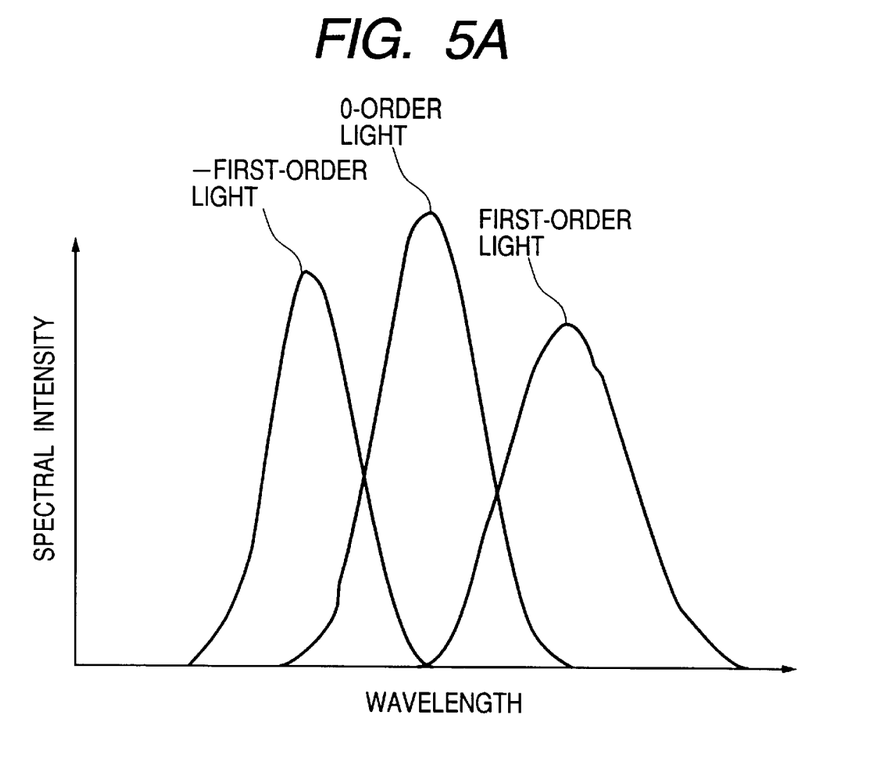
FIGS. 5A and 5B are charts showing the spectral characteristics of a reflective diffraction grating of the present invention.
Figure 5B:
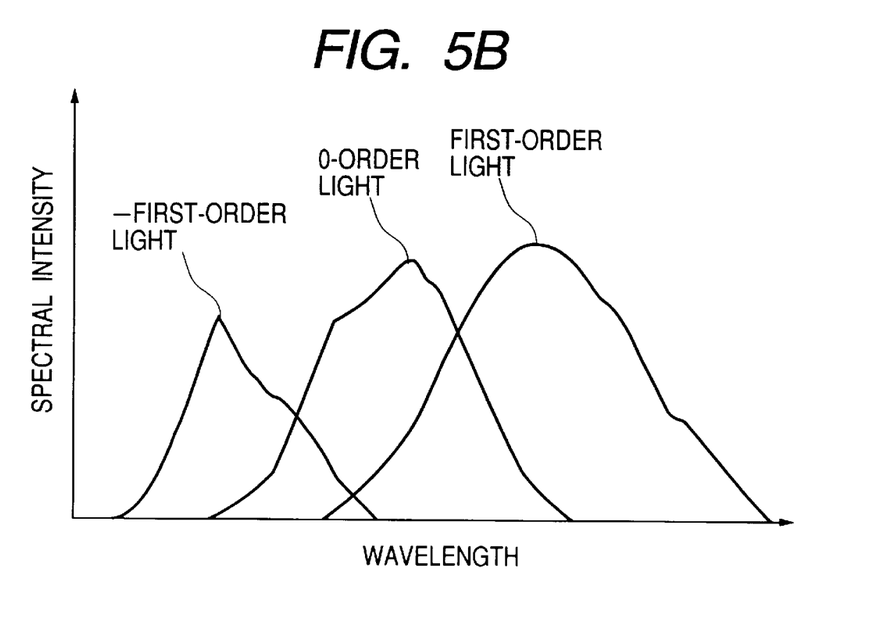

In general, the diffraction efficiency of the one-dimensional binary-type diffraction grating 101 is higher, over the entire wavelength range, in a polarization component parallel to the XZ plane which is parallel to the grating direction than in a polarization component in the Y direction which is perpendicular to the grating direction. FIGS. 5A and 5B show an example of the spectral characteristics showing such property.

FIG. 5B shows the spectral intensity of the polarized components of different orders, perpendicular to the grating direction, among the light emerging from the one-dimensional binary-type diffraction grating 101, while FIG. 5A shows the spectral intensity of the polarized components of different orders, parallel to the grating direction. The scale of the abscissa or the ordinate is same in FIG. 5A and FIG. 5B.

The configuration of the present embodiment in which the plane parallel to the grating direction is parallel to the polarizing direction allows to introduce the polarized components of higher diffraction efficiency, among the light emerging from the diffraction grating 101, into the optical modulation element 102, thereby further reducing the loss in the light quantity and realizing high diffracting effect in the colored lights of the entire wavelength region. It is therefore rendered possible to easily bring the emerging colored lights from the reflective one-dimensional binary-type diffraction grating 101 close to the ideal spectral characteristics.

Also the diffraction grating is arranged so that the grating direction thereof is parallel to the XZ plane formed by the central ray of the white light beam (W) entering the reflective diffraction grating 101 and the central ray of the 0-th order diffracted light (G light) emerging therefrom, thereby maintaining more equal beam diameter after the separation of the R, G, B colored lights and enabling equal illumination of the optical modulation element 102, in comparison with the arrangement in which the grating direction of the diffraction grating is perpendicular to the above-mentioned plane.

In the present embodiment, it is also conceivable to fold the optical path by positioning a mirror or the like therein, but, in such case, the foregoing considerations may be applied in a state where such folded optical path is developed.

It is also possible, by suitable selection of the shape of the grating, to achieve the separation into the colored lights of the spectral characteristics close to those of the three primary colors of the NTSC signal employed in the television, thereby providing an image of high color reproducibility when the colored lights are synthesized after optical modulation.

The one-dimensional binary-type diffraction grating improves the assembling property and provides an inexpensive color image display apparatus, since the angular adjustment of the incident light to the optical modulation element needs to be executed on such one-dimensional binary-type diffraction grating only.

Also such design of the diffraction grating of the present embodiment that the grating thicknesses within a pitch are made mutually different and that the grating widths within a pitch are not equal allows to reduce the inner side-band components of the ±first-order diffracted lights, thereby enabling ideal color separation.

In the present embodiment, the ratio of the grating widths L1, L2, L3 and L4 is selected as 0.9:1.3:1.3:0.9 to reduce the inner side-band components of the ±first-order diffracted lights. In the present embodiment, the G color is selected as the 0th-order light, but the ideal color separation can also be achieved by selecting other colors as the 0th-order light.

Figure 6:
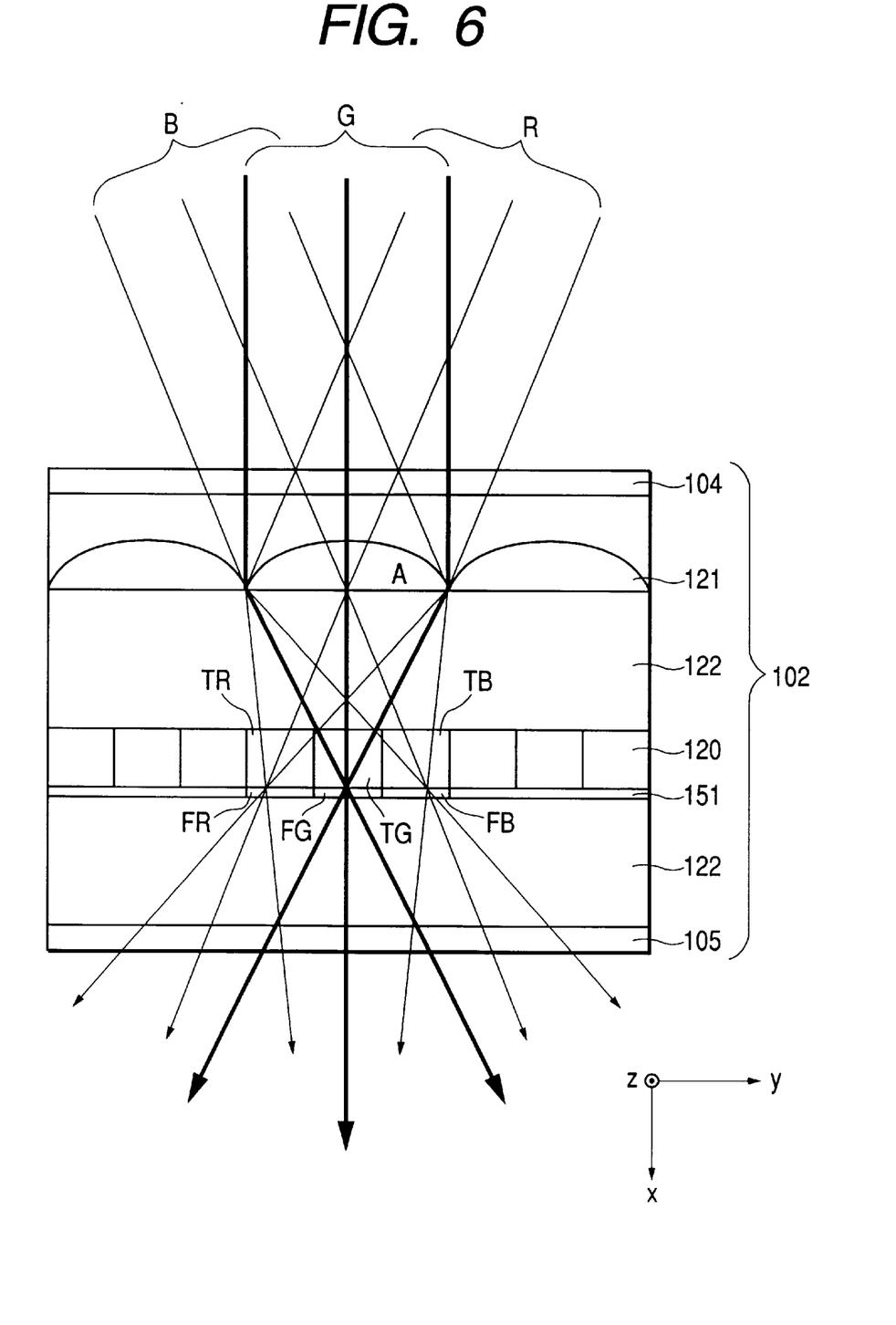
FIG. 6 is a schematic view of an optical modulation apparatus of the present invention.

It is also possible, as shown in FIG. 6, to provide color correcting filters 151 in a position where the colored lights are separated. In such configuration, if the spectral characteristics of the colored lights separated by the diffraction grating are different from those of the image signals, such colored lights are introduced respectively into color filters FR, FG, FB for obtaining ideal color information, thereby enabling faithful color reproduction of the image. In such case, the loss of the efficiency in light utilization is not significant, since the colored lights are passed through the color filters 151 after the color separation.

Figure 7:
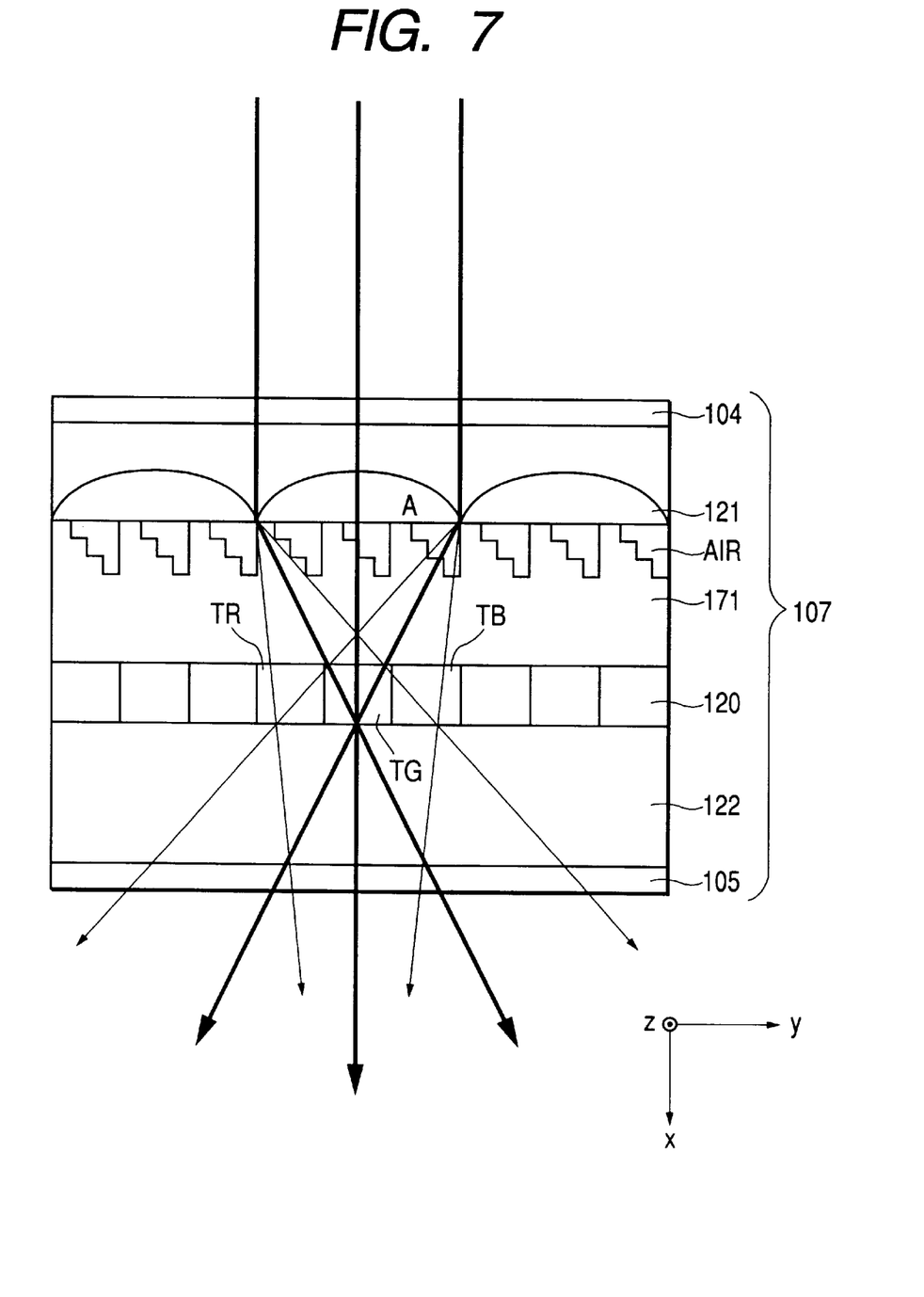
FIG. 7 is a schematic view of an embodiment 2 of the present invention.

FIG. 7 is a schematic view of an embodiment 2 of the present invention. In contrast to the embodiment 1 shown in FIG. 1 and employing the reflective diffraction grating as the color separation means, the present embodiment employs a transmissive diffraction grating 171 which is positioned between a microlens array 121 and a controlled portion 120 to constitute an optical modulation element 107. In other aspects the present embodiment is same as the embodiment 1.

In the present embodiment, the grating direction of the diffraction grating lies in the XZ plane formed by the central ray of the white light beam entering the diffraction grating 171 and the central ray of the 0th-order diffracted light emerging therefrom, and the incident light is introduced obliquely to the XZ plane with an arbitrary non-zero incident angle. For this reason, in comparison with the case of perpendicular entry to the transmissive diffraction grating, the grating thickness can be reduced without loss in the light amount, to achieve further compactization. Such configuration provides effects similar to those in the embodiment 1.

In the present embodiment, the diffraction grating 171 and the optical modulation element 107 are constructed integrally, but they may be formed separately. Also the position of the microlens array 121 and the diffraction grating 171 may be inverted.

Also similar effects can be obtained in a transmissive or reflective configuration in which the R, G, B colored lights, emerging from the pixels of the optical modulation element 107, are synthesized after emission to the outside.

Figure 8:
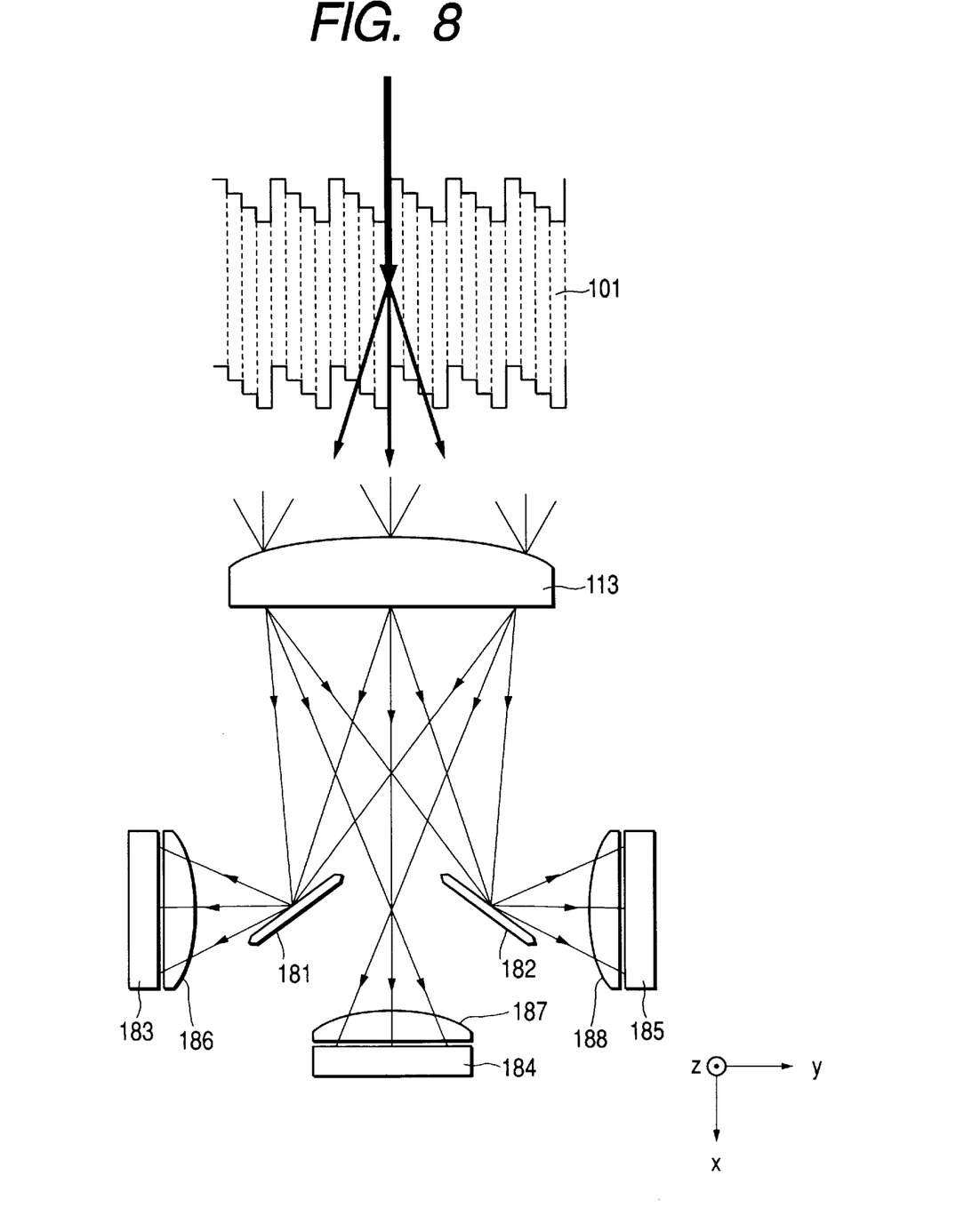
FIG. 8 is a schematic view of an embodiment 3 of the present invention.

FIG. 8 is a schematic view of an embodiment 3 of the present invention, employing a reflective one-dimensional binary-type diffraction grating 101. The grating direction of the diffraction grating 101 lies in and is parallel to the XZ plane formed by the central ray of the white light beam entering the diffraction grating 101 and the central ray of the 0th-order diffracted light emerging therefrom, and the incident light beam enters obliquely with an arbitrary non-zero incident angle.

There are also provided condenser lenses 113, 186, 187, 188; high reflectance mirrors 181, 182; and transmissive optical modulation elements 183, 184, 185. Each of the optical modulation elements 183 to 185 is composed, as in the embodiment 1, of an optical modulation control portion (not shown), an optical modulation controlled portion, transparent substrates sandwiching the optical modulation controlled portion composed of TN liquid crystal, two polarizing plates which are positioned adjacent to the two transparent substrates and are in a mutually cross Nicol arrangement etc.

The present embodiment realizes an optical modulation element of a high efficiency of light utilization, without employing the microlens array.

The present embodiment provides effects similar to those of the embodiment 1, by synthesizing, on a screen, the three light beams (images) emerging from the optical modulation elements 183, 184, 185 through one or three projection lenses (not shown), or by synthesizing three light beams (images) by a color synthesizing system such as dichroic mirrors and projecting thus synthesized image onto a screen by a projection optical system.

The present embodiment employs transmissive optical modulation elements, but similar effects can also be obtained by employing reflective optical modulation elements in which the optical modulation controlled portion is covered with a reflective surface and by synthesizing the light beams, emerging from such optical modulation elements on the screen through a projection optical system.

The present embodiment employs TN liquid crystal in the optical modulation controlled portion, but the liquid crystal of other types may also be employed for this purpose.

Figure 9:
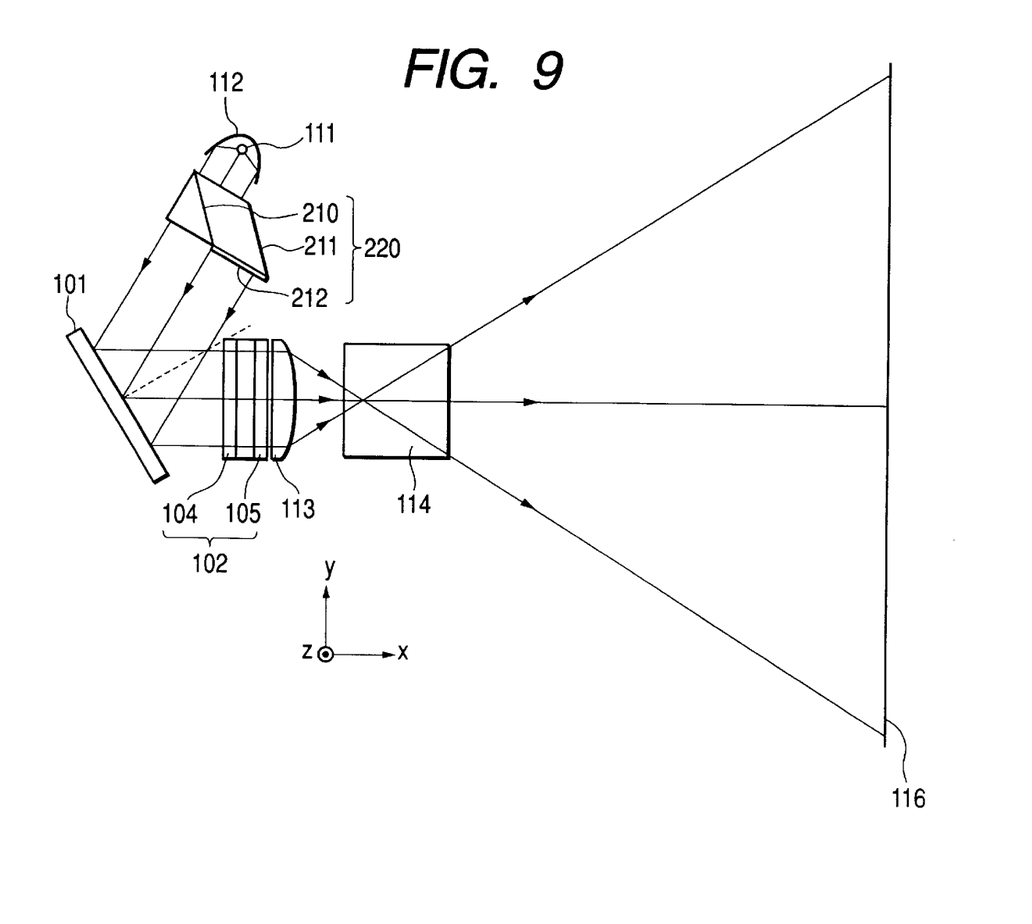
FIG. 9 is a schematic view of a projection apparatus constituting an embodiment 4 and utilizing the optical modulation apparatus of the present invention.

FIG. 9 is a schematic view of an embodiment 4 of the present invention.

The present embodiment is same in configuration as the embodiment 1 shown in FIG. 1, except that the light beam entering the diffraction grating 101 is linearly polarized by a polarization converting element 220, which is composed of a polarizing beam splitter consisting of a polarizing film 210 sandwiched between two transparent members, a reflective face 211, and a ½ wavelength plate 212. Other components are same as those in the embodiment 1.

A parabolic mirror 112 converts the light beam from a white light source 111 positioned at the focal point into a parallel light beam for entry into the polarization converting element 220, and a P-polarized component alone is transmitted thereby and emerges therefrom. An S-polarized component reflected by the polarizing beam splitter 210 is reflected by the reflective face 211, then converted into the P-polarized component by the ½ wavelength plate 212 and emerges from the polarization converting element 220.

The polarizing direction of the P-polarized light emerging from the polarization converting element 220 and the polarizing direction of the polarized incident light to the optical modulation element 102 lie in and are parallel to a plane formed by the grating direction (vector) of the one-dimensional binary-type diffraction grating 101 and the normal line (vector) thereof. Therefore, in contrast to the configuration in which the reflective one-dimensional binary-type diffraction grating receives the natural light (with random polarized directions), the present embodiment in which the incident light consists of the P-polarized component only allows to increase the diffracting efficiency of the diffraction grating, thereby reducing the loss in the light amount. Also, since high diffracting efficiency can be obtained over the entire wavelength range, the spectral characteristics of the light emerging from the reflective one-dimensional binary-type diffraction grating can be easily brought close to the ideal characteristics.

The present embodiment employs the polarization converting element of the configuration shown in FIG. 9, but it may also be composed of a polarization converting element of flat plate shape, in which plural portions of the polarization converting element 220 are connected in a direction perpendicular to the optical axis.

Furthermore, there may be employed a polarization converting element of another configuration, including at least a polarized light separation means, at least a reflection means, and at least a polarization converting means (wavelength converting plate or prism).

What is claimed is:

1. An optical modulation device comprising a binary-type diffraction grating for separating light into plural colored lights and an optical modulation element including plural pixels and modulating linear polarizing light in each of said plural pixels wherein each of said colored lights from said binary-type diffraction grating is introduced into corresponding pixels of said plural pixels, said optical modulation element comprising an entrance side polarizing element and an exit side polarizing element, wherein a polarizing direction of said entrance side polarizing element is parallel to a plane formed by the grating direction vector of said binary type diffraction grating and the normal line vector thereof.

2. An optical modulation device comprising a binary-type diffraction grating for separating light into plural colored lights, and optical modulation elements each including plural pixels and modulating linear polarizing light in said pixels, wherein each of said optical modulation elements comprises an entrance side polarizing element and an exit side polarizing element, and each of said colored lights from said diffraction grating is introduced into corresponding one of optical modulation elements;

wherein a polarizing direction of said entrance side polarizing element is parallel to a plane formed by the grating direction vector of said binary-type diffraction grating and the normal line vector thereof.

3. An optical modulation device according to claim 2, wherein, said entrance side polarizing element is used in common for said plural optical modulation elements.

4. An optical modulation device according to claim 2, wherein said diffraction grating is a binary-type one.

5. An optical modulation device according to claim 2, wherein said diffraction grating is a reflection type one.

6. An optical modulation device according to claim 1 or 2, wherein said entrance side polarizing element is a flat-shaped or prism-shaped polarizing beam splitter composed of dielectric multi-layered film, or a polarizing plate, for selecting arbitrary linearly polarized light from natural light.

7. An optical modulation device according to claim 1 or 2, wherein the grating direction of said diffraction grating lies on a plane formed by the central axis of the light beam entering said diffraction grating and the central axis of the 0th-order diffracted light therefrom.

8. An optical modulation device according to claim 1 or 2, wherein said diffraction grating is a reflective diffraction grating provided, on the surface of the grating, with a metal film, or a metal film and a protective film.

9. An optical modulation device comprising a reflection type diffraction grating for separating light into plural colored lights, and an optical modulation element comprising plural pixels and modulating linear polarizing light in each of said plural pixels wherein each of said colored lights from said reflection type diffraction grating is introduced into corresponding pixels of said plural pixels, wherein said optical modulation element has an entrance side polarizing element and an exit side polarizing element:

wherein a polarizing direction of said entrance side polarizing element is parallel to a plane formed by the grating direction vector of said reflection-type diffraction grating and the normal line vector thereof.

10. An optical modulation device according to claim 2 or 9, wherein said diffraction grating is a one-dimensional blazed diffraction grating.

11. An optical modulation device according to claim 1, 2 or 9, wherein said diffraction grating is a one-dimensional binary-type diffraction grating.

12. An optical modulation device according to claim 11, wherein said one-dimensional binary-type diffraction grating is composed of a stepped structure with uneven step widths.

13. An optical modulation device according to claim 1, 2 or 9, wherein the colored lights from said diffraction grating are introduced into the pixels of said optical modulation element through a condenser lens.

14. An optical modulation device according to claim 1, 2 or 9, comprising color filters corresponding to the colored lights, in the optical path of the colored lights entering the plural pixels of said optical modulation element and in a position where the colored lights are spatially separated from one another.

15. A projection apparatus adapted to project, on a plane, image information based on the pixels of the optical modulation element in an optical modulation device according to claim 1, 2 or 9.

16. A projection apparatus according to claim 15, wherein each of said plural pixels comprises liquid crystal.

17. A projection apparatus according to claim 16, wherein said optical modulation element is adapted to emit the light beams modulated in said pixels after reflection by reflection means.

18. A projection apparatus according to claim 16, wherein said liquid crystal is nematic type liquid crystal.

19. An optical modulation device comprises a diffraction grating for separating light into plural colored lights and an optical modulation element including plural pixels, and modulating linear polarizing light in each of said plural pixels wherein each of said colored lights from said diffraction grating is introduced into corresponding pixels of said plural pixels and wherein a polarizing direction of said linear polarizing light is parallel to a plane formed by the grating direction vector of said diffraction grating and the normal line vector thereof.

20. An optical modulation device comprising a diffraction grating for separating light into plural colored lights, and optical modulation elements each including plural pixels and modulating linear polarizing light in said pixels, and each of said colored lights from said diffraction grating is introduced into corresponding one of optical modulation elements;

wherein said a polarizing direction of said linear polarizing light is parallel to a plane formed by the grating direction vector of said diffraction grating and the normal line vector thereof.

21. An optical modulation device according to claim 19 or 20, wherein said diffraction grating is a binary-type grating.

22. An optical modulation device according to claim 19 or 20, wherein said diffraction grating is a reflection-type grating.

23. An optical modulation device according to claim 19 or 20, wherein an entrance side polarizing element of said optical modulation element is a flat-shaped or prism-shaped polarizing beam splitter comprises dielectric multilayered film or a polarizing plane, for selecting arbitrary linearly polarized light from natural light.

24. An optical modulation device according to claim 19 or 20, wherein the grating direction of said diffraction grating lies on a plane formed by the central axis of the light beam entering said diffraction grating and the central axis of the 0th-order diffracted light therefrom.

25. An optical modulation device according to claim 19 or 20, wherein said diffraction grating is a reflective diffraction grating provided, on the surface of the grating, with a metal film, or a metal film and a protective film.

26. An optical modulation device according to claim 19 or 20, wherein said diffraction grating is a one-dimensional blazed diffraction grating.

27. An optical modulation device according to claim 19 or 20, wherein said diffraction grating is a one-dimensional binary-type diffraction grating.

28. An optical modulation device according to claim 27, wherein said one-dimensional binary-type diffraction grating comprises a stepped structure with uneven step widths.

29. An optical modulation device according to claim 19 or 20, comprising color filters corresponding to the colored lights, in the optical path of the colored lights entering the plural pixels of said optical modulation element and in a position where the colored lights are spatially separated from one another.

30. An optical modulation device comprises a diffraction grating for separating light into plural colored lights and an optical modulation element comprises plural pixels and modulating linear polarizing light in each of said plural pixels wherein each of said colored lights from said diffraction grating is introduced into corresponding pixels of said plural pixels and wherein a polarizing direction of an entrance polarizing element of said optical modulation element is parallel to a plane formed by the grating direction vector of said diffraction grating and the normal line vector thereof.

31. An optical modulation device comprising a diffraction grating for separating light into plural colored lights, and optical modulation elements each including plural pixels and modulating linear polarizing light in said pixels, wherein each of said colored lights from said diffraction grating is introduced into corresponding one of optical modulation elements; and wherein a polarizing direction of an entrance polarizing element of said optical modulation element is parallel to a plane formed by the grating direction vector of said diffraction grating and the normal line vector thereof.

32. An optical modulation device according to claim 30 or 31, wherein said diffraction grating is a binary-type grating.

33. An optical modulation device according to claim 30 or 31, wherein said diffraction grating is a reflection type grating.

34. An optical modulation device according to claim 30 or 31, wherein an entrance side polarizing element of said optical modulation element is a flat-shaped or prism-shaped polarizing beam splitter comprises dielectric multilayered film, or a polarizing plate, for selecting arbitrary linearly polarized light from natural light.

35. An optical modulation device according to claim 30 or 31, wherein the grating direction of said diffraction grating lies on a plane formed by the central axis of the light beam entering said diffraction grating and the central axis of the $0^{th}$-order diffracted light therefrom.

36. An optical modulation device according to claim 30 or 31, wherein said diffraction grating is a reflective diffraction grating provided, on the surface of the grating, with a metal film, or a metal film and a protective film.

37. An optical modulation device according to claim 30 or 31, wherein said diffraction grating is a one-dimensional blazed diffraction grating.

38. An optical modulation device according to claim 30 or 31, wherein said diffraction grating is a one-dimensional binary-type diffraction grating.

39. An optical modulation device according to claim 38, wherein said one-dimensional binary-type diffraction grating comprises a stepped structure with uneven step widths.

40. An optical modulation device according to claim 30 or 31, comprising color filters corresponding to the colored lights, in the optical path of the colored lights entering the plural pixels of said optical modulation element and in a position where the colored lights are spatially separated from one another.

41. A projection apparatus adapted to project, on a plane, image information based on the pixels of the optical modulation element in an optical modulation device according to claim 19, 20, 30 or 31.

42. A projection apparatus according to claim 41 wherein each of said plural pixels comprises liquid crystal.

43. A projection apparatus according to claim 42, wherein said optical modulation element is adapted to emit the light beams modulated in said pixels after reflection by reflection means.

44. A projection apparatus according to claim 42, wherein said liquid crystal is nemetic type liquid crystal.

* * * * *

UNITED STATES PATENT AND TRADEMARK OFFICE
CERTIFICATE OF CORRECTION

PATENT NO. : 6,045,228
DATED : April 4, 2000
INVENTOR(S) : Junko Kuramochi, et al.

It is certified that error appears in the above-identified patent and that said Letters Patent is hereby corrected as shown below:

Column 1,
Line 55, "element;" should read -- element, --.

Column 2,
Line 6, "element;" should read -- element, --.

Column 8,
Line 19, "binary type" should read -- binary-type --;
Line 28, "elements;" should read -- elements, --;
Line 40, "reflection type" should read --reflection-type --; and
Line 62, "element:" should read -- element, --.

Column 9,
Line 46, "elements;" should read -- elements, --;
Line 60, "comprises" should read -- comprising a --; and
Line 61, "plane," should read -- plate, --.

Column 10,
Line 45, "reflection type" should read -- reflection-type --; and
Line 50, "comprises" should read -- composed of --.

Signed and Sealed this

Twenty-third Day of October, 2001

Attest:

*Attesting Officer*

NICHOLAS P. GODICI
*Acting Director of the United States Patent and Trademark Office*